US010697368B1

(12) United States Patent
Anshu

(10) Patent No.: US 10,697,368 B1
(45) Date of Patent: Jun. 30, 2020

(54) HYPERBARIC POWER PLANT

(71) Applicant: Tilahun Anshu, Lowell, MA (US)

(72) Inventor: Tilahun Anshu, Lowell, MA (US)

( * ) Notice: Subject to any disclaimer, the term of this patent is extended or adjusted under 35 U.S.C. 154(b) by 0 days.

(21) Appl. No.: 16/444,285

(22) Filed: Jun. 18, 2019

(51) Int. Cl.
F02C 6/00 (2006.01)
H02P 9/04 (2006.01)
F02C 1/02 (2006.01)
F01L 15/10 (2006.01)
F02C 6/16 (2006.01)
H02P 101/25 (2016.01)

(52) U.S. Cl.
CPC ............... F02C 6/00 (2013.01); F01L 15/10 (2013.01); F02C 1/02 (2013.01); F02C 6/16 (2013.01); H02P 9/04 (2013.01); H02P 2101/25 (2015.01)

(58) Field of Classification Search
CPC ...... F02C 6/00; F02C 1/02; F02C 6/16; F01D 15/10; H02P 9/04
See application file for complete search history.

(56) References Cited

U.S. PATENT DOCUMENTS

| | | | | |
|---|---|---|---|---|
| 5,449,961 A * | 9/1995 | Ludwig | ................... | F01D 15/10 310/58 |
| 2011/0138765 A1* | 6/2011 | Lugg | ....................... | F01D 15/10 60/39.01 |
| 2012/0060506 A1* | 3/2012 | King | ....................... | F01D 9/065 60/782 |
| 2012/0060507 A1* | 3/2012 | King | ....................... | F01D 5/081 60/782 |
| 2018/0313364 A1* | 11/2018 | Moeckel | ............... | F04D 29/542 |
| 2019/0086091 A1* | 3/2019 | Rickey | ..................... | F23R 3/56 |

* cited by examiner

Primary Examiner — Viet P Nguyen
(74) Attorney, Agent, or Firm — Kyle A. Fletcher, Esq.

(57) ABSTRACT

The hyperbaric load control for a power plant is an energy storage device used to regulate the tangent velocity of a gas turbine. Specifically, the hyperbaric load control for a power plant: a) releases previously stored energy in the form of supplemental electrical energy to compensate for an energy deficit created by an operating condition where the electrical energy demanded by the electric load is greater than the energy provided by the gas turbine; and, b) absorbs and stores the excess energy created by an operating condition where the energy transferred to the electric generator from the gas turbine is greater than the electric energy demanded by the electric load. The hyperbaric load control for a power plant comprises an electric motor, a compressor, a high pressure gas tank, a supplemental turbine, a supplemental electric generator, and a control system.

18 Claims, 2 Drawing Sheets

HYPERBARIC POWER PLANT

CROSS REFERENCE TO RELATED APPLICATIONS

Not Applicable

STATEMENT REGARDING FEDERALLY SPONSORED RESEARCH

Not Applicable

REERENCE TO APPENDIX

Not Applicable

BACKGROUND OF THE INVENTION

Field of the Invention

The present invention relates to the field of mechanical engineering including engines using special working fluids, more specifically, a regulating means adapted for use in a plant characterized by a more than one engine delivering power external to the plant. (F01K23/105)

The typical gas turbine, including steam turbines, convert a consistent flow of gas into rotational energy that is often subsequently used to rotate an electric generator. The electric generator provides electrical energy to an electrical load. During the operation of the gas turbine, the rotating element of the gas turbine (hereinafter the gas turbine rotor) rotates with an angular momentum equal to the tangent velocity of the rotation of the rotor times the mass of the rotor. The tangent velocity of the rotor is expressed as rotations per second, or Hertz (Hz). When a gas turbine is attached to an electric generator, the required power specifications of the generated electric energy sets strict limits on the tangent velocity of the gas turbine rotor. As an example, the gas turbine rotor of gas turbines feeding electricity into the national electric grid of the United States is required to have 5,184,000 rotations in a 24 hour period.

A common challenge of operating a gas turbine and electric generator is the sensitivity of both the gas turbine and the electric generator to the balance of the energy transfer between the energy provided by the gas turbine and the electric generator. In an ideal situation, which is also the normal operating condition, the energy transferred from the gas turbine to the electric generator equals the electric energy transferred from the electric generator to the electric load. A load imbalance occurs during the operation of a gas turbine and electric generator when: a) the electrical energy demanded by the electric load is greater than the energy provided by the gas turbine; and, b) the energy transferred to electric generator from the gas turbine is greater than the electric energy demanded by the electric load.

In the circumstance of the electrical energy demanded by the electric load is greater than the energy provided by the gas turbine, the tangent velocity of the gas turbine rotor decrease to the point where permanent damage will occur to the electric generator. In the circumstance of the energy transferred to electric generator from the gas turbine is greater than the electric energy demanded by the electric load, the tangent velocity of the gas turbine rotor increases to the point where permanent damage will occur to the gas turbine rotor. In either condition, the response to either load imbalance is to disconnect the electric generator from the electric load and to initiate emergency procedures to shut down the gas turbine and electric generator.

This emergency response to a load imbalance between a gas turbine, an electric generator, and an electric load that allows for the continued operation of the gas turbine and the electric generator would be of benefit.

The Hyperbaric Power Plant uses artificially generated wind power(using series fans, compressors, generators) to generate electricity which is a green energy source. The strength of the artificially generated wind-power to operate the system can be adjusted depending on the output needed (load). If more output is needed, it increases the strength of the incoming windpower using the systems described above, which increases the velocity of the turbines, and hence more rotations, which means more energy. The Hyperbaric Power Plant feeds back itself in loop where the energy cab be stored, used for compressors, generators and fans that aide to run the system. This hyperbaric load can be modulated according to a desired energy output. There is no fatigue in the system as compared to other previously known systems i.e gas turbine and etc.

Potentially there is no limit to the amount of energy that can be generated and harvested by this system. Hyperbaric Power Plant can be operated from small scale to mega scale, and anything in between and beyond. And it can be operational anywhere.

Hyperbaric Power Plant has numerous advantages: 1. Traditional windmill(farm): the capacity is dependent upon the naturally occurring wind power, which is limited. Plus it has negative environmental consequences. 2. Geothermal/hydroplants: have significant and obvious limitations, along with the negative environmental consequences. 3. Solar Energy: with the current known methods to capture it, its capacity is limited. Plus there are places where this energy is not readily available. 4. Nuclear/Coal/Gas plants: have series of limitations, and unwanted environmental consequences. 5. Traditional Generators: limited in many ways, all along with the environmental consequences.

SUMMARY OF INVENTION

This disclosure addresses the challenges of operating a gas turbine and an electric generator that are described above.

The hyperbaric load control for a power plant is an energy storage device used to regulate the tangent velocity of a gas turbine. Specifically, the hyperbaric load control for a power plant: a) releases previously stored energy in the form of supplemental electrical energy to compensate for an energy deficit created by an operating condition where the electrical energy demanded by the electric load is greater than the energy provided by the gas turbine; and, b) absorbs and stores the excess energy created by an operating condition where the energy transferred to the electric generator from the gas turbine is greater than the electric energy demanded by the electric load. The hyperbaric load control for a power plant comprises an electric motor, a compressor, a high pressure gas tank, a supplemental turbine, a supplemental electric generator, and a control system.

These together with additional objects, features and advantages of the hyperbaric load control for a power plant will be readily apparent to those of ordinary skill in the art upon reading the following detailed description of the presently preferred, but nonetheless illustrative, embodiments when taken in conjunction with the accompanying drawings.

In this respect, before explaining the current embodiments of the hyperbaric load control for a power plant in detail, it is to be understood that the hyperbaric load control for a power plant is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hyperbaric load control for a power plant.

It is therefore important that the claims be regarded as including such equivalent construction insofar as they do not depart from the spirit and scope of the hyperbaric load control for a power plant. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
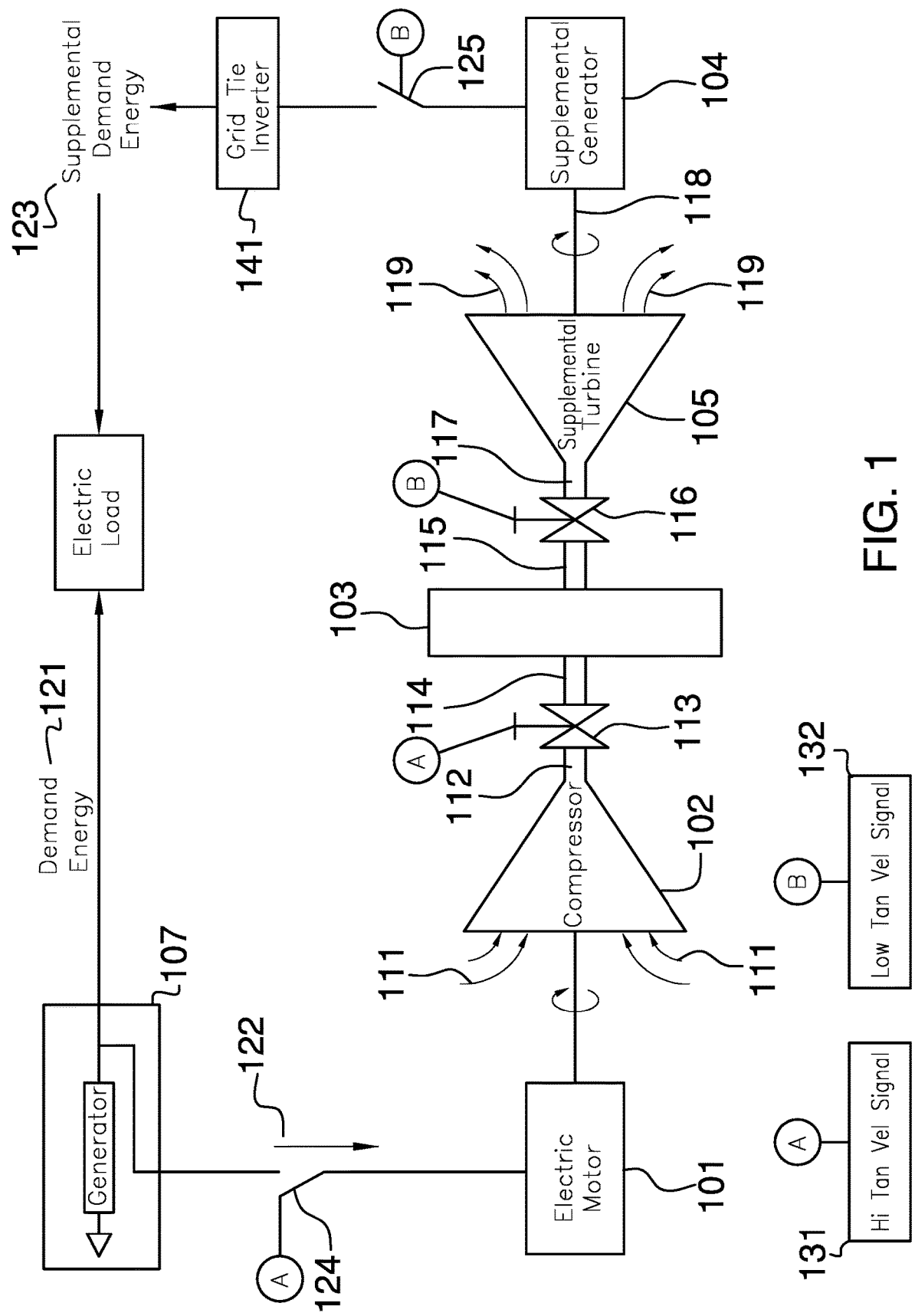
FIG. 1 is a block diagram or schematic view of an embodiment of the disclosure.
Figure 2:
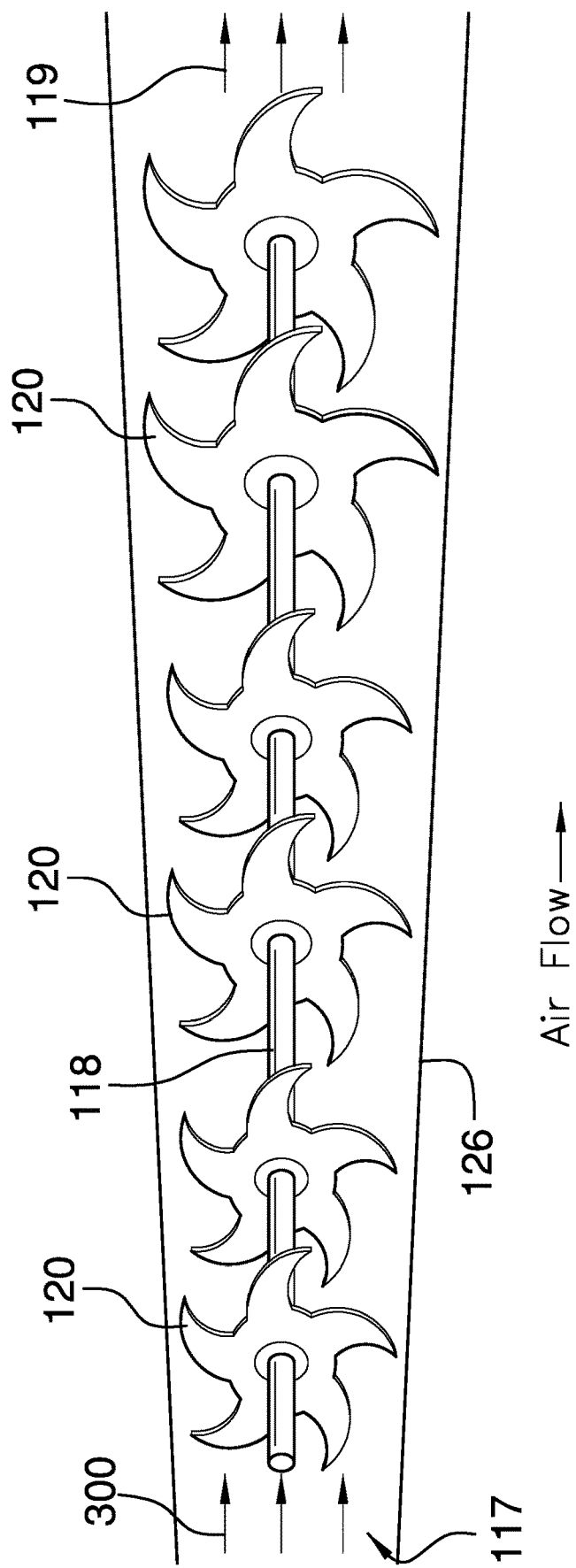
FIG. 2 is a detailed view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. Detailed reference will now be made to one or more potential embodiments of the disclosure, which are illustrated in FIGS. 1 through 2.

This disclosure addresses the challenges in operating a gas turbine and an electric generator 107 that are described above.

The hyperbaric load control for a power plant 100 (hereinafter invention) is an energy storage device used to regulate the tangent velocity of a gas turbine. Specifically, the invention 100: a) releases previously stored energy in the form of supplemental electrical energy 123 to compensate for an energy deficit created by an operating condition where the electrical energy demanded 121 by an electric load is greater than the energy provided by the gas turbine to the electric generator; and, b) absorbs and stores the excess energy created by an operating condition where the energy transferred to electric generator from the gas turbine is greater than the electric energy demanded 121 by the electric load. The invention 100 comprises an electric motor 101, a compressor 102, a high pressure gas tank 103, a supplemental turbine 105, a supplemental electric generator 104, a control system 106, and a grid tie inverter 141. The electric motor 101, the compressor 102, and the high pressure gas tank 103 stores the excess energy 122 generated by the gas turbine and electric generator 107 when the tangent velocity of the gas turbine rotor is greater than the targeted tangent velocity. The supplemental turbine 105, the supplemental electric generator 104, and the grid tie inverter 141 transfer supplemental electric energy 123 to the electric load when the tangent velocity of the gas turbine rotor is lesser than the targeted tangent velocity.

The gas turbine and electric generator 107 generates demand energy 121 to meet the electric energy requirements of the electric load.

The electric motor 101 drives the first drive shaft 110 which drives the compressor 102. The compressor 102 draws air flow through the compressor intake 111 into the compressor 102 and drives compressed air into the compressor exit pipe 112. The compressed air from the compressor 102 then flows through the high pressure gas tank intake valve 113 through the high pressure gas tank intake feed pipe 114 and into the high pressure gas tank 103 where it is stored until needed. When supplemental electric energy 123 is required, the high pressure gas tank exit valve 116 is opened to release the compressed air which flows through the high pressure gas tank exit pipe 115, high pressure gas tank exit valve 116 and the turbine feed pipe 117 to rotate the supplemental turbine 105. The compressed air then exits the supplemental turbine 105 as the turbine exhaust air 119. The rotation of the supplemental turbine 105 rotates the second drive shaft 118 which in turn drives the supplemental electric 104 to generate supplemental electric energy 123 that can be fed into the system. The flow of excess energy 122 into the electric motor 101 is controlled with the electric motor grid relay 124. The flow of supplemental electric energy 123 into the electric grid is controlled with the generator grid relay 125.

The purpose of the electric motor 101 is to drive the compressor 102. Specifically, the electric motor 101 drives the rotational component of the compressor 102 that is required to compress the air. The size and type of electric motor 101 selected will depend on the design requirements of the compressor 102 and the invention 100. Commercially available electric motors would be suitable for use with the invention 100.

The purpose of the compressor 102 is to generate the compressed air that is stored in the high pressure gas tanks 103. Suitable compressors include, but are not limited to axial flow compressors and centrifugal compressors. Commercially available compressors would be suitable for use with the invention 100.

The purpose of the high pressure gas tank 103 is to store compressed air. The high pressure gas tank 103 stores the energy used by the invention 100 to generate electricity. The higher the pressure the compressed air is stored and the greater the volume of compressed air that is stored (at a given pressure), the more energy will be stored in the tanks and the more electricity can be generated. The implementation of the high pressure gas tank 103 in this disclosure explicitly allows for the use a single tank or the use of multiple tanks configured in a "farm" system to increase the volume and the energy storage capacity of the system. The pressure of the compressed air stored in the high pressure gas tank 103 and the overall volume capacity of the single tank or tank farm will depend on the design requirements of the invention 100. Commercially available high pressure tanks, pipes, and fittings would be suitable for use with the invention 100.

The purpose of the supplemental turbine 105 is to convert the compressed air to rotational mechanical energy by flowing the compressed air through a series of blades that turn a wheel or cylinder that in turn rotates the second drive shaft 118.

As shown in FIG. 2, the supplemental turbine 105 comprises a plurality of turbine blades 120, the second drive shaft 118, and a turbine tube 126. The plurality of turbine blades 120 are mounted on the second drive shaft 118. The turbine tube 126 is a tube that is formed like a cone in that the diameter of the turbine tube 126 increases in the direction of air flow from the turbine feed pipe 117 to the turbine exhaust 119. This increase in diameter increases the volume of the turbine tube 126 which causes a pressure drop in the compressed air. This pressure drop causes the compressed air to flow over the plurality of turbine blades 120 which causes the plurality of turbine blades 120 to rotate which in turn rotates the second drive shaft 118. Turbine designs are well known and documented in the art. The specific turbine size and design selected will depend on the design requirements of the invention 100.

The purpose of the supplemental electric generator 104 is to convert the rotational energy generated by the supplemental turbine 105 into electric energy. Commercially available electric generators would be suitable for this purpose. The electric energy generated by the supplemental electric generator 104 is fed into the grid tie inverter 141 through the generator grid relay 125. The grid tie inverter synchronizes the electric energy provided by the supplemental electric generator 104 to the demand energy 121 already being generated by the gas turbine and electric generator 107.

The control system 106 is an electric circuit that controls the flow of electrical energy into and out of the invention 100. The control system 106 comprises a high tangent velocity signal 131 and a low tangent velocity signal 132. The high tangent velocity signal 131 monitors the tangent velocity of the gas turbine rotor. The low tangent velocity signal 132 monitors the tangent velocity of the gas turbine rotor.

When the tangent velocity of the gas turbine rotor is greater than the target tangent velocity, the high tangent velocity signal 131 activates the control system 106 to close the electric motor grid relay 124 and open the high pressure gas intake valve 113. The electric motor grid relay 124 allows the excess energy 122, in the form of electrical energy, to flow into the electric motor 101 which in turn operates the compressor 102. Opening the high pressure gas intake valve 113 allows the gas compressed by the compressor 102 to be transported into the high pressure gas tank 103. The excess energy 122 is stored as a pressurized gas in the high pressure gas tank 103.

When the tangent velocity of the gas turbine rotor is lesser than the target tangent velocity, the low tangent velocity signal 131 activates the control system 106 to close the generator grid relay 125 and open the high pressure gas exit valve 116. This allows the previously stored energy, in the form of a compressed gas, to flow into the supplemental turbine 105 which in turn rotates the supplemental electric generator 104. Closing the generator grid relay 125 allows the supplemental electrical energy 123 generated by the supplemental electric generator 104 to flow into the grid tie inverter 141 for subsequent transport to the electric load.

The following definitions were used in this disclosure:

Compress: In this disclosure, compress means to force into a smaller space.

Compressed Gas: In this disclosure, compressed gas refers to a gas that has been compressed to a pressure greater than normal temperature and pressure when stored at normal temperature.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically cause the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

External Power Source: As used in this disclosure, an external power source is a source of the energy that is externally provided to enable the operation of the present disclosure. Examples of external power sources include, but are not limited to, electrical power sources and compressed air sources.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Gas: As used in this disclosure, a gas refers to a state (phase) of matter that is fluid and that fills the volume of the structure that contains it. Stated differently, the volume of a gas always equals the volume of its container.

Grid Tie Inverter: As used in this disclosure, a grid tie inverter is an electric device that converts dc electricity into ac electricity that is synchronized with a national electric grid.

High Pressure Gas Tank: As used in this disclosure, a high pressure gas tank is a container that is used to store compressed gas.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Motor: As used in this disclosure, a motor refers to the method of transferring energy from an external power source into rotational mechanical energy.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority.

The national electric grid sells electrical power for use by an electrical load. The national electric grid invoices for electrical power based on the total energy consumed by the electrical load. The national electric grid measures the energy consumption of an electrical load with an electrical meter.

Normal Temperature and Pressure: As used in this disclosure, normal temperature and pressure refers to gas storage conditions corresponding to 20 degrees C. at 100 kPa (approx. 1 atmosphere). Normal temperature and pressure is often abbreviated as NTP.

Relay: As used in this disclosure, a relay is an automatic electromagnetic or electromechanical device that reacts to changes in voltage or current by opening or closing a switch in an electric circuit. Relays further defined with a coil and a switch. Applying a voltage to the coil, usually referred to as energizing the coil, will cause the coil to change the position of the switch. Note: Though transistors can be configured to perform switching functions, transistors used for switching functions are handled separately in this disclosure and are explicitly excluded from this definition.

Rotation: As used in this disclosure, rotation refers to the cyclic movement of an object around a fixed point or fixed axis. The verb of rotation is to rotate.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tank: As used in this disclosure, a tank is an enclosed hollow structure used to store a fluid.

Turbine: In this disclosure, a turbine is a machine that converts the kinetic energy of a moving fluid or gas to rotational energy. In common usage, a turbine generally accomplishes this by forcing the moving fluid or gas through a series of blades arrayed around the circumference of a wheel or a cylinder. Alternative, a turbine can run in a reverse mode wherein externally provided rotational energy will be converted into kinetic energy that is expressed as the movement or compression of a fluid or gas.

Valve: As used in this disclosure, a valve is a device that is used to control the flow of a fluid (gas or liquid) through a pipe, tube, or hose.

With respect to the above description, it is to be realized that the optimum dimensional relationship for the various components of the invention described above and in FIGS. 1 through 2 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A hyperbaric load control comprising
an electric motor, a compressor, a high pressure gas tank, a supplemental turbine, a supplemental electric generator, a control system, and a grid tie inverter;
wherein the hyperbaric load control is an energy storage device used to regulate the tangent velocity of a gas turbine;
wherein the gas turbine and electric generator generates demand energy to meet the electric energy requirements of the electric load;
wherein the hyperbaric load control releases previously stored energy in the form of supplemental electrical energy to compensate for an energy deficit created by an operating condition where the electrical energy demanded by an electric load is greater than the energy provided by the gas turbine to the electric generator;
wherein the hyperbaric load control absorbs and stores the excess energy created by an operating condition where the energy transferred to the electric generator from the gas turbine is greater than the electric energy demanded by the electric load;
wherein the electric motor, the compressor, and the high pressure gas tank stores the excess energy generated by the gas turbine and electric generator when the tangent velocity of the gas turbine rotor is greater than the targeted tangent velocity;
wherein the supplemental turbine, the supplemental electric generator, and the grid tie inverter transfer supplemental electric energy to the electric load when the tangent velocity of the gas turbine rotor is lesser than the targeted tangent velocity.

2. The hyperbaric load control according to claim 1
wherein the electric motor drives a first drive shaft which drives the compressor;
wherein the compressor draws air flow through the compressor intake into the compressor and drives compressed air into a compressor exit pipe;
wherein the compressed air from the compressor then flows through a high pressure gas tank intake valve and a high pressure gas tank intake feed pipe and into the high pressure gas tank.

3. The hyperbaric load control according to claim 2 wherein the high pressure gas tank exit valve is opened to release compressed gas which flows through a high pressure gas tank exit pipe, a high pressure gas tank exit valve and a turbine feed pipe to rotate the supplemental turbine.

4. The hyperbaric load control according to claim 3 wherein the compressed air then exits the supplemental turbine as the turbine exhaust air.

5. The hyperbaric load control according to claim 4 wherein the rotation of the supplemental turbine rotates a second drive shaft which in turn drives the supplemental electric to generate supplemental electric energy.

6. The hyperbaric load control according to claim 5 wherein the flow of supplemental electric energy into the electric grid is controlled with a generator grid relay.

7. The hyperbaric load control according to claim 6 wherein the electric motor drives the rotational component of the compressor that is required to compress the air.

8. The hyperbaric load control according to claim 7 wherein the purpose of the high pressure gas tank is to store a compressed gas.

9. The hyperbaric load control according to claim 8 wherein the supplemental turbine converts the compressed air to rotational mechanical energy.

10. The hyperbaric load control according to claim 9 wherein the electric energy generated by the supplemental electric generator is fed into the grid tie inverter through the generator grid relay.

11. The hyperbaric load control according to claim 10 wherein the grid tie inverter synchronizes the electric energy provided by the supplemental electric generator to the demand energy already being generated by the gas turbine and electric generator.

12. The hyperbaric load control according to claim 11 wherein the control system is an electric circuit that controls the flow of electrical energy into and out of the hyperbaric load control.

13. The hyperbaric load control according to claim 12
wherein the control system comprises a high tangent velocity signal and a low tangent velocity signal;
wherein the high tangent velocity signal monitors the tangent velocity of the gas turbine rotor;
wherein the low tangent velocity signal monitors the tangent velocity of the gas turbine rotor;
wherein the turbine is further defined with a target tangent velocity.

14. The hyperbaric load control according to claim 13 wherein the high tangent velocity signal activates the control system to close the electric motor grid relay and open the high pressure gas intake valve.

15. The hyperbaric load control according to claim 14
wherein the electric motor relay grid allows electrical energy to flow into the electric motor which in turn operates the compressor;
wherein opening the high pressure gas intake valve allows the gas compressed by the compressor to be transported into the high pressure gas tank.

16. The hyperbaric load control according to claim 15 wherein the low tangent velocity signal activates the control system to close the generator grid relay and open the high pressure gas exit valve.

17. The hyperbaric load control according to claim 16
wherein the high pressure gas exit valve allows compressed gas to flow into the supplemental turbine;
wherein closing the generator grid relay allows the supplemental electrical energy generated by the supplemental electric generator to flow into the grid tie inverter for subsequent transport to the electric load.

18. The hyperbaric load control according to claim 17
wherein the supplemental turbine comprises a plurality of turbine blades, the second drive shaft, and a turbine tube;
wherein the turbine tube is a tube that is formed like a cone in that the diameter of the turbine tube increases in the direction of air flow from the turbine feed pipe to the turbine exhaust;
wherein the plurality of turbine blades are mounted on the second drive shaft.

* * * * *